(12) United States Patent
Bhardwaj et al.

(10) Patent No.: US 10,770,692 B1
(45) Date of Patent: Sep. 8, 2020

(54) SOLID STATE BATTERIES MADE ON A MOBILE COMPUTING DEVICE

(71) Applicant: Google LLC, Mountain View, CA (US)

(72) Inventors: Ramesh C. Bhardwaj, Freemont, CA (US); Tai Sup Hwang, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 695 days.

(21) Appl. No.: 14/823,050

(22) Filed: Aug. 11, 2015

(51) Int. Cl.
*H01M 2/02* (2006.01)
*H01M 10/052* (2010.01)
*H01M 10/0562* (2010.01)
*H01M 4/64* (2006.01)
*G06F 1/16* (2006.01)

(52) U.S. Cl.
CPC ........ *H01M 2/0202* (2013.01); *G06F 1/1616* (2013.01); *G06F 1/1635* (2013.01); *H01M 4/64* (2013.01); *H01M 10/052* (2013.01); *H01M 10/0562* (2013.01); *H01M 2220/30* (2013.01); *H01M 2300/0068* (2013.01)

(58) Field of Classification Search
None
See application file for complete search history.

(56) References Cited

U.S. PATENT DOCUMENTS

| | | | | |
|---|---|---|---|---|
| 5,597,660 A | * | 1/1997 | Bates | ...... H01L 23/58 429/322 |
| 5,705,294 A | * | 1/1998 | Lake | ...... H01M 2/0222 429/163 |
| 7,217,478 B2 | * | 5/2007 | Ugaji | ...... C23C 14/0676 429/322 |
| 8,383,261 B2 | * | 2/2013 | Mizuta | ...... H01M 2/021 429/130 |
| 2003/0044678 A1 | * | 3/2003 | Esq | ...... G06F 1/1613 429/162 |
| 2003/0068559 A1 | | 4/2003 | Armstrong et al. | |
| 2004/0048157 A1 | * | 3/2004 | Neudecker | ...... H01M 4/0421 429/231.2 |
| 2011/0256455 A1 | | 10/2011 | Coowar et al. | |

(Continued)

FOREIGN PATENT DOCUMENTS

| | | |
|---|---|---|
| CN | 102739827A A | 10/2012 |
| CN | 102739828A A | 10/2012 |
| WO | WO 2014/209323 A1 | 12/2014 |

*Primary Examiner* — Helena Oi K Conley
(74) *Attorney, Agent, or Firm* — McDonnell Boehnen Hulbert & Berghoff LLP

(57) ABSTRACT

An example system includes an enclosure of a mobile computing device, where the enclosure includes an external surface and an internal surface. The system also includes a lithium-based battery having a plurality of battery layers deposited on the external surface of the enclosure such that the enclosure is a substrate for the plurality of battery layers. The plurality of battery layers include at least (i) a first conductive layer plated on a portion of the external surface of the enclosure, where the first conductive layer is configured as a cathode current collector of the lithium-based battery, and (ii) a second conductive layer plated on a respective portion of the external surface of the enclosure, where the second conductive layer is configured as a portion of an anode current collector of the lithium-based battery.

6 Claims, 4 Drawing Sheets

(56) References Cited

U.S. PATENT DOCUMENTS

| | | | |
|---|---|---|---|
| 2012/0218699 A1* | 8/2012 | Leung | G06F 1/1616 |
| | | | 361/679.08 |
| 2014/0120422 A1 | 5/2014 | Dyke et al. | |
| 2015/0044572 A1 | 2/2015 | Hucker et al. | |

* cited by examiner

SOLID STATE BATTERIES MADE ON A MOBILE COMPUTING DEVICE

BACKGROUND

Mobile computing devices, such as laptops, tablets, phones, wearable computing devices, are often used without being plugged into power and depend on their batteries for operation. It is thus desirable to have these mobile devices run longer on a single battery charge.

SUMMARY

The present disclosure describes embodiments that relate to solid state batteries made on a mobile computing device. In one aspect, the present disclosure describes a system. The system includes an enclosure of a mobile computing device, where the enclosure includes an external surface and an internal surface. The system also includes a lithium-based battery having a plurality of battery layers deposited on the external surface of the enclosure such that the enclosure is a substrate for the plurality of battery layers. The plurality of battery layers include at least (i) a first conductive layer plated on a portion of the external surface of the enclosure, where the first conductive layer is configured as a cathode current collector of the lithium-based battery, and (ii) a second conductive layer plated on a respective portion of the external surface of the enclosure, where the second conductive layer is configured as a portion of an anode current collector of the lithium-based battery.

In another aspect, the present disclosure describes a method. The method includes providing an enclosure of a mobile computing device, where the enclosure includes an external surface and an internal surface. The method also includes depositing a plurality of battery layers of a lithium-based battery on the external surface of the enclosure such that the enclosure is a substrate for the plurality of battery layers. The depositing includes (i) depositing a first conductive layer on a portion of the external surface of the enclosure, where the first conductive layer is configured as a cathode current collector of the lithium-based battery, and (ii) depositing a second conductive layer on a respective portion of the external surface of the enclosure, where the second conductive layer is configured as a portion of an anode current collector of the lithium-based battery.

In still another aspect, the present disclosure describes a laptop computing device. The laptop computing device includes a top enclosure comprising an external surface and an internal surface. The laptop computing device also includes a bottom enclosure pivotally attached to the top enclosure via one or more hinges. The laptop computing device further includes a lithium-based battery having a plurality of battery layers deposited on the external surface of the top enclosure such that the top enclosure is a substrate for the plurality of battery layers. The plurality of battery layers include at least: (i) a first conductive layer plated on a portion of the external surface of the top enclosure, where the first conductive layer is configured as a cathode current collector of the lithium-based battery, and (ii) a second conductive layer plated on a respective portion of the external surface of the top enclosure, where the second conductive layer is configured as a portion of an anode current collector of the lithium-based battery.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

In Examples, mobile computing devices may be powered by batteries that are made separately and then installed in the computing devices. Example mobile computing devices include laptops, tablets, phones, wearable computing devices, etc. These mobile computing devices are often used without being plugged into power and depend on their batteries for operation. It is thus desirable to have these mobile devices run longer on a single battery charge.

Mobile computing devices may have spaces that might not be used efficiently. For instance, flat surfaces of enclosures of these devices are currently used for protecting the devices and enclosing electronic components, but might have no other functionality. Disclosed herein are methods and systems for using such flat surfaces as a substrate on which battery layers are deposited to form a rechargeable battery that can be used instead of or in conjunction with other batteries within the mobile computing devices. In this manner, a mobile computing device can run longer, and the flat surfaces of the device's enclosure are used efficiently.

II. EXAMPLE MOBILE COMPUTING DEVICE

Figure 1:
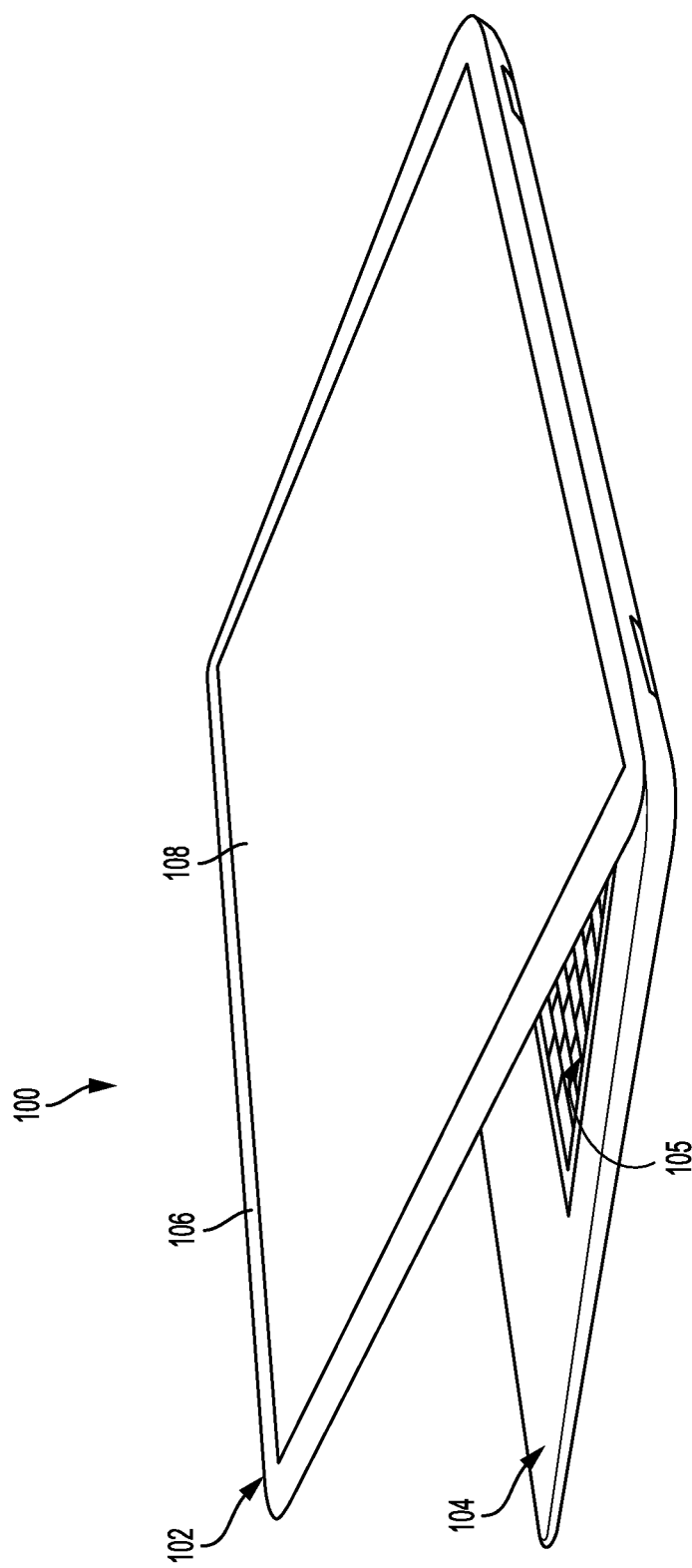
FIG. 1 illustrates an example mobile computing device, in accordance with an example implementation.

Referring to the Figures, FIG. 1 illustrates an example mobile computing device, in accordance with an example implementation. Particularly, FIG. 1 illustrates an example laptop 100. The laptop 100 has a top enclosure 102 and a bottom enclosure 104 that are pivotally attached to one another by way of one or more hinges, for example.

The top enclosure 102 may, for example, be made of a metal, and may house electronic components associated with a display of the laptop 100. The top enclosure 102 has an external surface 106, and may also have an internal surface (not shown in FIG. 1). The bottom enclosure 104 may house components associated with a keyboard 105.

In examples, the laptop 100 may include a separate battery installed within either the top enclosure 102 or the bottom enclosure 104 to provide power to the electronic components of the laptop 100. Such a battery has a limited capacity that limits a time period during which the laptop 100 can operate without being plugged to a power source. To extend the time period, the external surface 106 may be used as a substrate for a battery that supplements one or more other batteries within the laptop 100. In some examples, the battery constructed on the external surface 106 may be a sole source of battery power to the laptop 100, and thus might not supplement power from another battery.

In an example implementation, battery layers 108 may deposited on the external surface 106 to form a battery. In this manner, the top enclosure 102 may form a substrate upon which the battery layers 108 are deposited. In an example, the battery layers 108 may be deposited on one side of the external surface of the top enclosure 102. In another example, the battery layers 108 may be deposited on both the external surface and the internal surface of the top enclosure 102.

III. EXAMPLE BATTERY LAYERS

Figure 2:
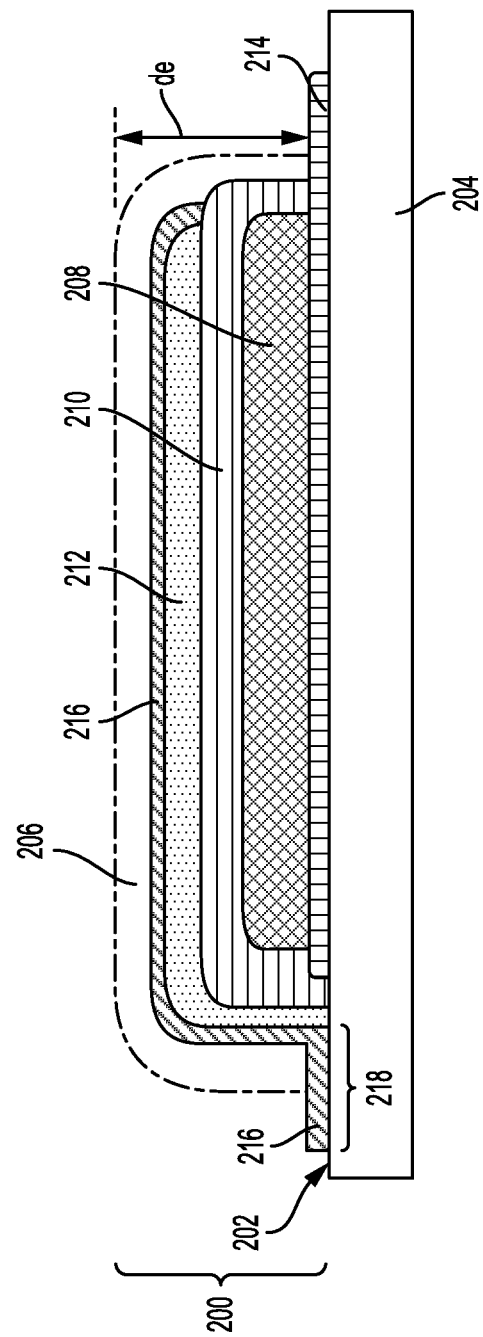
FIG. 2 illustrates battery layers deposited on an external surface of an enclosure of a mobile computing device, in accordance with an example implementation.

FIG. 2 illustrates battery layers 200 deposited on an external surface 202 of an enclosure 204 of a mobile computing device, in accordance with an example implementation. The enclosure 204 may, for example, be the top enclosure 102 of the laptop 100. In this case, the external surface 202 corresponds to the external surface 106 of the top enclosure 102. However, the external surface 202 may be associated with an enclosure of any other type of mobile computing devices. For instance, the enclosure 204 may include a back cover of a mobile phone or a table computing device, and the external surface 202 may thus be an external surface of such a back cover.

As illustrated in FIG. 2, the enclosure 204 is configured as a substrate upon which the battery layers 200 are deposited. In an example, the enclosure 204 may be made of aluminum or another metal. The battery layers 200 may include a protective coating 206 for protecting and enclosing the battery layers 200. The battery layers 200 may include a plurality of layers including, for example, a cathode 208, an electrolyte layer 210, an anode 212, a cathode current collector 214, and an anode current collector 216. The battery layers 200 may include other layers.

The enclosure 204 may be plated with a first conductive layer made of gold or nickel plating to form the cathode current collector 214. The enclosure 204 may also be plated with a second conductive layer made of gold or nickel plating to form at least a portion 218 of the anode current collector 216. The remaining portion of the anode current collector 216 may be disposed between the protective layer 206 and the anode 212, as shown in FIG. 2. Gold and nickel are used herein as examples. Other conductive materials could be used as well.

In an example, the battery layers 200 may be associated with a lithium ion (Li-ion) battery. Conventional Li-ion batteries may contain a liquid electrolyte. Such a liquid electrolyte may be difficult to deposit on a surface of an enclosure of a mobile computing device. To alleviate such difficulty, the electrolyte layer 210 may be made of lithium phosphorous oxynitride (LiPON), which is a solid electrolyte. Other example solid electrolytes could be used as well.

Generally, a battery's capacity is the amount of electric charge the battery can deliver at a rated voltage. The more electrode material contained in the battery the greater the battery's capacity. A small battery has less capacity than a larger battery with the same chemistry, although both batteries can develop the same open-circuit voltage. Capacity can be measured in units such as ampere hour (Ah) and milli Ah (mAh).

As an example, a collective thickness "de" of the battery layers 200 deposited on the external surface 202 of the substrate/enclosure 204 may be 18 micrometers (μm). In an example, assuming that the battery layers 200 are deposited on an area having a width of 200 millimeters (mm) and a length of 300 mm, the battery capacity may amount to about 276 mAh. Increasing the thickness and/or the area on which the battery layers 200 are deposited may increase capacity of the associated battery. For example, the thickness "de" can be increased up to 56 μm. However, other thicknesses are contemplated herein based on a desired capacity for the battery. Another way to increase capacity of the battery formed by the battery layers 200 is to deposit the battery layers 200 on an internal surface of the substrate/enclosure 204 as well as the external surface 202 as described next.

Figure 3:
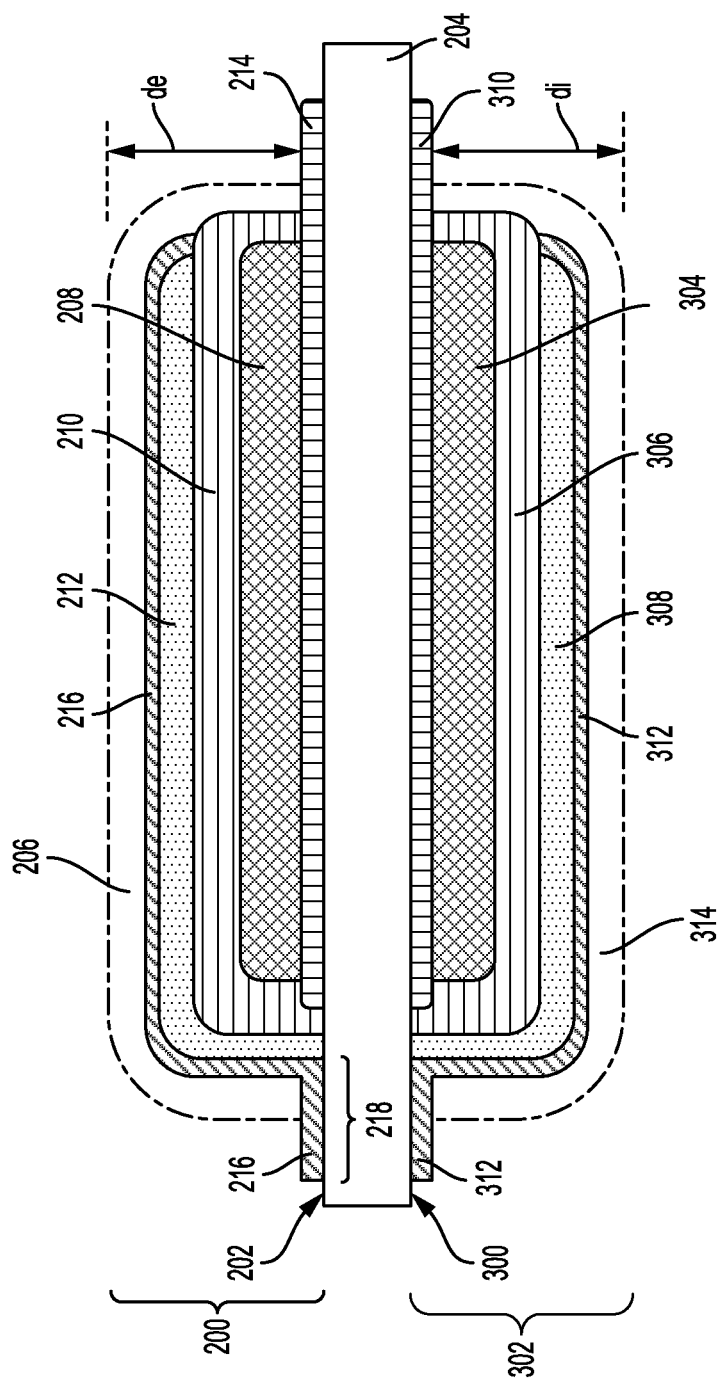
FIG. 3 illustrates battery layers deposited on both the external surface and an internal surface of the enclosure illustrated in FIG. 2, in accordance with an example implementation.

FIG. 3 illustrates battery layers deposited on both the external surface 202 and an internal surface 300 of the enclosure 204 illustrated in FIG. 2, in accordance with an example implementation. Specifically, the battery layers 200 are deposited on the external surface 202 of the enclosure 204, while battery layers 302 are deposited on the internal surface 300 of the enclosure 204. As depicted in FIG. 3, the battery layers 302 may be similar to the battery layers 200. For example, the battery layers 302 may include a cathode 304, an electrolyte layer 306, an anode 308, a cathode current collector 310, an anode current collector 312, and a protective coating 314. However, in some examples, the battery layers 302 may be different from the battery layers 200. For instance, the battery layers 302 may have different construction or different thickness.

In examples, similar to the battery layers 200, a collective thickness "di" of the battery layers 300 may amount to a thickness between 18 μm and 56 μm. By having battery layers on both the external surface 202 and the internal surface 300 of the enclosure 204, the battery capacity increases. For example, if the battery layers 300 are the same as the battery layers 200 and are deposited on the same area, the battery capacity may be doubled compared to just having the battery layers 200 on the external surface 202.

Thus, a battery is formed using the enclosure 204 as a substrate. Such battery can supplement an internal battery of the mobile computing device (e.g., the laptop 100) having the enclosure 204 and increase the running life of the mobile computing device for a single charge cycle. In examples, the mobile computing device might not have an internal battery, and the battery formed on the enclosure 204 may be the sole source of power to the mobile computing device.

IV. EXAMPLE METHODS

Figure 4:
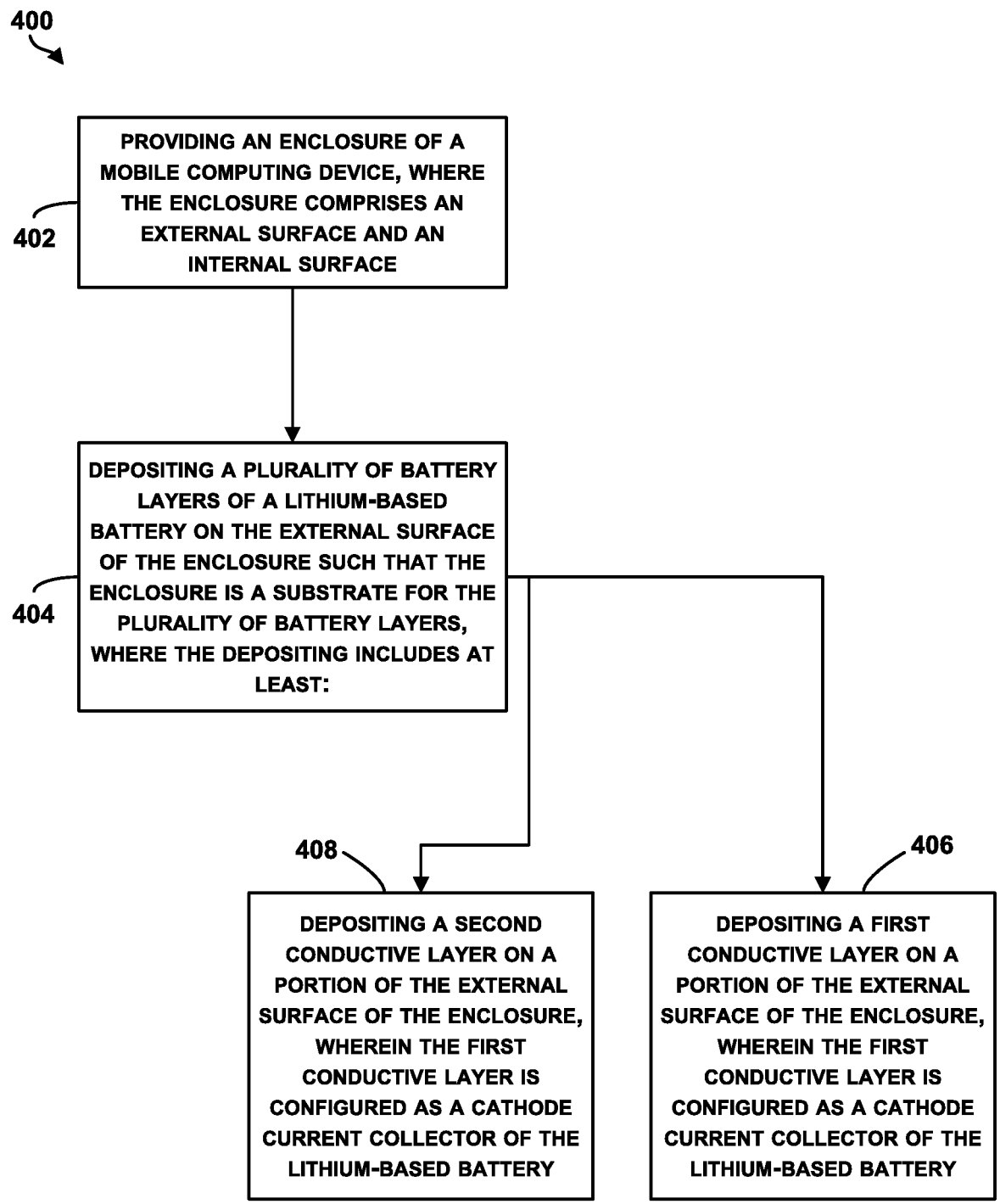
FIG. 4 is a flow chart of a method for making a solid state battery on an enclosure of a mobile computing device, in accordance with an example implementation.

FIG. 4 is a flow chart of a method 400 for making a solid state battery on an enclosure of a mobile computing device, in accordance with an example implementation. The method 400 may include one or more operations, functions, or actions as illustrated by one or more of blocks 402-408. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 402, the method 400 includes providing an enclosure of a mobile computing device, where the enclosure comprises an external surface and an internal surface. The term "providing" as used herein with regard to an enclosure includes any action to make the enclosure available for use, such as bringing the enclosure to an apparatus or to a work environment for further processing of the enclosure (e.g., for depositing layers on the enclosure, coupling the enclosure to another component, etc.).

In line with the discussion related to FIGS. 1-3, an enclosure of a mobile computing device (e.g., the laptop 100) may be configured to have an external surface (e.g., the external surface 106 or 202) and an internal surface (e.g., the internal surface 300). For example, if the enclosure is a top enclosure (e.g., the top enclosure 102) of a laptop computing device, the enclosure may house components that support a display of the laptop. In examples, the enclosure may be made of aluminum or another metal.

At block 404, the method 400 includes depositing a plurality of battery layers of a lithium-based battery on the external surface of the enclosure such that the enclosure is a substrate for the plurality of battery layers. As discussed above, the external and internal surfaces of the enclosure may be utilized to construct a battery to provide power to electronic components of the mobile computing device. Specifically, the enclosure may form a substrate upon which the battery layers are deposited. In an example, the battery layers may be deposited just on the external surface of the enclosure 102. In another example, the battery layers may be deposited on the external surface and additional battery layers may be deposited on the internal surface of the enclosure to increase the capacity of the battery.

As shown at block 406 of the method 400, depositing the battery layers may include at least depositing a first conductive layer on a portion of the external surface of the enclosure. The first conductive layer may be configured as a cathode current collector (e.g., the cathode current collector 214) of the lithium-based battery.

As shown at block 408 of the method 400, the depositing may further include depositing a second conductive layer on a respective portion of the external surface of the enclosure. The second conductive layer may be configured as a portion of an anode current collector (e.g., the anode current collector 216) of the lithium-based battery.

Further, depositing the battery layers may also include depositing a protective coating for the lithium-based battery such that one or more battery layers are disposed between the first conductive layer and the protective coating. The protecting coating may be part of a package that contains the battery layers.

One of the deposited battery layers may be an electrolyte layer. A liquid electrolyte may be difficult to deposit on the external or the internal surface of the enclosure of the mobile computing device. To alleviate such difficulty, the electrolyte used in the electrolyte layer may include LiPON, which is a solid electrolyte. Other layers that can be deposited may include a cathode layer and an anode layer. Other layers can be deposited as well.

V. CONCLUSION

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A system comprising:
    an enclosure of a mobile computing device, wherein the enclosure comprises an external surface and an internal surface, wherein the external surface is opposite the internal surface; and
    a lithium-based battery having a plurality of battery layers deposited on the external surface of the enclosure such that the enclosure is a substrate for the plurality of battery layers, wherein the plurality of battery layers include at least:
    (i) a first conductive layer plated on a portion of the external surface of the enclosure, wherein the first conductive layer is configured as a cathode current collector of the lithium-based battery,
    (ii) a second conductive layer plated on a respective portion of the external surface of the enclosure, wherein the second conductive layer is configured as a portion of an anode current collector of the lithium-based battery,
    (iii) a protective coating that covers, at least partially, the first conductive layer and the second conductive layer, and
    (iv) an electrolyte layer having at least a portion disposed between an anode and a cathode of the lithium-based battery, wherein the anode is in contact with the anode current collector, the electrolyte layer, and the external surface of the enclosure, wherein the cathode is in contact with the cathode current collector and electrolyte layer without contacting the external surface of the enclosure, and wherein the anode current collector is in contact with the electrolyte layer, wherein the plurality of battery layers further include one or more layers disposed between the first conductive layer and the protective coating, wherein the protective coating is in contact with the electrolyte layer, without contacting the substrate, the anode, or the cathode, and wherein the protective coating partially covers the first conductive layer and the second conductive layer such that at least a portion of the second conductive layer is exposed.

2. The system of claim 1, wherein the electrolyte layer comprises solid lithium phosphorous oxynitride.

3. The system of claim 1, further comprising:
    an additional lithium-based battery having an additional plurality of battery layers deposited on the internal surface of the enclosure such that the enclosure is a substrate for the additional plurality of battery layers.

4. The system of claim 1, wherein the enclosure comprises a metal.

5. The system of claim 1, wherein the enclosure is configured to support a display of the mobile computing device.

6. The system of claim 1, wherein the enclosure is a top enclosure of a laptop computing device.

\* \* \* \* \*